United States Patent
Yoshioka

(10) Patent No.: US 9,701,191 B2
(45) Date of Patent: Jul. 11, 2017

(54) GRILLE SHUTTER DEVICE

(71) Applicant: AISAN KOGYO KABUSHIKI KAISHA, Obu-shi, Aichi (JP)

(72) Inventor: Mamoru Yoshioka, Nagoya (JP)

(73) Assignee: AISAN KOGYO KABUSHIKI KAISHA, Obu-shi (JP)

( * ) Notice: Subject to any disclaimer, the term of this patent is extended or adjusted under 35 U.S.C. 154(b) by 0 days.

(21) Appl. No.: 14/711,360

(22) Filed: May 13, 2015

(65) Prior Publication Data
US 2015/0343894 A1 Dec. 3, 2015

(30) Foreign Application Priority Data

May 27, 2014 (JP) .................................. 2014-108881

(51) Int. Cl.
*B60K 11/08* (2006.01)
*B60K 11/06* (2006.01)

(52) U.S. Cl.
CPC ............ *B60K 11/085* (2013.01); *B60K 11/06* (2013.01)

(58) Field of Classification Search
CPC .............................. B60K 11/08; B60K 11/085
See application file for complete search history.

(56) References Cited

U.S. PATENT DOCUMENTS

| | | | | |
|---|---|---|---|---|
| 1,220,794 A | * | 3/1917 | Stephenson | F01P 7/10 105/62.2 |
| 1,480,095 A | * | 1/1924 | Moller | F01P 7/10 123/41.04 |
| 1,737,946 A | * | 12/1929 | Rood | F01P 7/10 165/98 |
| 5,141,026 A | * | 8/1992 | Collette | B60K 11/085 137/601.09 |
| 7,043,353 B2 | * | 5/2006 | Takemura | G01L 23/225 701/111 |

(Continued)

FOREIGN PATENT DOCUMENTS

| | | |
|---|---|---|
| CN | 203485742 U | 3/2014 |
| JP | H05-58172 A | 3/1993 |

(Continued)

OTHER PUBLICATIONS

Apr. 25, 2017 Office Action issued in Japanese Patent Application No. 2014-108881.

(Continued)

*Primary Examiner* — Katy M Ebner
(74) *Attorney, Agent, or Firm* — Oliff PLC

(57) ABSTRACT

A grille shutter device includes a grille shutter configured to change its opening degree and placed in a grille opening continuous with an engine room of a vehicle. An ECU controls a motor to control an opening degree of the grille shutter to regulate running air from the grille opening to an engine. The running air passing through the grille shutter flows to a lower part of the cylinder block. The ECU controls the motor to control the opening degree of the grille shutter according to a detected temperature of the lower part of the cylinder block by a temperature sensor. When judging that warm-up of the lower part of the cylinder block is not yet completed, the ECU controls the motor to close the grille shutter in order to block the running air flow from the grille opening to the lower part of the cylinder block.

13 Claims, 14 Drawing Sheets

(56) References Cited

U.S. PATENT DOCUMENTS

| | | | | |
|---|---|---|---|---|
| 7,766,111 B2* | 8/2010 | Guilfoyle | B60K 11/04 | 180/68.1 |
| 8,025,045 B2* | 9/2011 | Pettersson | B60K 11/04 | 123/41.59 |
| 8,091,668 B2* | 1/2012 | Amano | B60K 11/085 | 123/41.05 |
| 8,161,919 B2* | 4/2012 | Klotz | B60K 11/085 | 123/41.04 |
| 8,292,014 B2* | 10/2012 | Sugiyama | B60K 11/085 | 123/41.06 |
| 8,517,130 B2* | 8/2013 | Sakai | B60K 11/085 | 180/68.1 |
| 8,561,738 B2* | 10/2013 | Charnesky | B60K 11/085 | 180/68.1 |
| 8,645,028 B2* | 2/2014 | Mochizuki | B60K 11/085 | 123/41.05 |
| 8,646,552 B2* | 2/2014 | Evans | B60K 11/085 | 180/68.1 |
| 8,667,931 B2* | 3/2014 | Kerns | F01P 7/10 | 123/41.05 |
| 8,739,744 B2* | 6/2014 | Charnesky | B60K 11/085 | 123/41.04 |
| 8,893,836 B2* | 11/2014 | Asano | B60K 11/085 | 180/68.3 |
| 8,983,736 B2* | 3/2015 | Hirota | B60K 11/085 | 123/41.04 |
| 9,103,265 B2* | 8/2015 | Okamoto | F01P 7/026 | |
| 9,168,827 B2* | 10/2015 | Povinelli | B60K 11/06 | |
| 2010/0243352 A1* | 9/2010 | Watanabe | B60K 11/085 | 180/68.1 |
| 2012/0090906 A1* | 4/2012 | Charnesky | B60K 11/085 | 180/68.1 |
| 2013/0046445 A1 | 2/2013 | Nishimura et al. | | |
| 2013/0223980 A1* | 8/2013 | Pastrick | F01D 5/00 | 415/1 |
| 2015/0147949 A1* | 5/2015 | Macfarlane | F01P 7/10 | 454/75 |
| 2015/0149043 A1* | 5/2015 | Macfarlane | B60K 11/085 | 701/49 |
| 2015/0159541 A1* | 6/2015 | Solazzo | B60K 11/085 | 73/114.68 |

FOREIGN PATENT DOCUMENTS

| | | |
|---|---|---|
| JP | 2000-142126 A | 5/2000 |
| JP | 2004-068640 A | 3/2004 |
| JP | 2006-118449 A | 5/2006 |
| JP | 2007-001503 A | 1/2007 |
| JP | 2007-001504 A | 1/2007 |
| JP | 2008-037343 A | 2/2008 |
| JP | 2012-246790 A | 12/2012 |
| JP | 2014-092140 A | 5/2014 |
| WO | 2011/138910 A1 | 11/2011 |

OTHER PUBLICATIONS

May 2, 2017 Office Action issued in Chinese Patent Application No. 201510278218.8.

* cited by examiner

23: AMBIENT TEMP. SENSOR
24: COOLANT TEMP. SENSOR
25: BLOCK LOWER-PART TEMP. SENSOR
26: ENGINE COMPARTMENT TEMP. SENSOR
27: VEHICLE SPEED SENSOR

9A: 1st GRILLE SHUTTER
9B: 2nd GRILLE SHUTTER
21A: 1st MOTOR
21B: 2nd MOTOR
23: AMBIENT TEMP. SENSOR
24: COOLANT TEMP. SENSOR
25: BLOCK LOWER-PART TEMP. SENSOR
26: ENGINE COMPARTMENT TEMP. SENSOR
27: VEHICLE SPEED SENSOR

GRILLE SHUTTER DEVICE

CROSS-REFERENCE TO RELATED APPLICATIONS

This application is based upon and claims the benefit of priority from each of the prior Japanese Patent Application No. 2014-108881 filed on May 27, 2014, the entire contents of which are incorporated herein by reference.

BACKGROUND OF THE INVENTION

Field of the Invention

The present invention relates to a grille shutter device configured to control running air flowing into an engine room through a grille opening located at the front side of a vehicle.

Related Art

As the above type of technique, there is conventionally known a grille shutter device disclosed in Japanese patent application publication No. 2007-1503 (JP-A-2007-1503), for example. This device includes an openable shutter mechanism placed in a grille opening located at the front side of a vehicle, a drive unit for driving the shutter mechanism to open/close, and a control unit for controlling the drive unit according to an operating state of the engine. The control unit controls the shutter mechanism via the drive unit to control running air flowing into an engine room through a grille opening.

Herein, for example, the shutter mechanism is closed during high-speed running of a vehicle to reduce a flow of running air (running airflow) into the engine room, so that the aerodynamic performance of the vehicle can be enhanced. Further, the shutter mechanism is closed during engine starting to reduce the quantity of air to be introduced into a radiator and the running airflow into the engine room, so that the time needed for engine warm-up can be shortened. While the engine temperature is trending higher, the shutter mechanism is opened to increase the quantity of running air flowing into the engine room, thereby enabling cooling the engine to an appropriate temperature.

SUMMARY OF INVENTION

Problem to be Solved by the Invention

Meanwhile, a cylinder head and a cylinder block constituting an engine are generally different in cooling effect by running air. Specifically, the cylinder head is less likely to be influenced by running air, whereas the cylinder block having a large exposed area is likely to be influenced by running air. Particularly, a lower part of the cylinder block is apt to be exposed to running air and thus is conceived to be greatly influenced by the running air. However, the device disclosed in JP-A-2007-1503 has not taken account of any influence of running air according to such different sites in the engine. Therefore, during operation of the engine, it would be difficult to control the cylinder block, particularly, the lower part of the cylinder block, to an appropriate temperature. It is conceived that controlling the lower part of the cylinder block to an appropriate temperature contributes to improvement in operation of the engine.

The present invention has been made under the above circumstances and has a purpose to provide a grille shutter device capable of controlling a cylinder block, especially, a lower part of the cylinder block to an appropriate temperature during operation of an engine.

Means of Solving the Problem

To achieve the above purpose, one aspect of the invention provides a grille shutter device for a vehicle, the vehicle having an engine placed in an engine room provided in a front part of the vehicle, the engine including a cylinder head and a cylinder block, and a grille opening being provided at a front side of the vehicle and communicating with the engine room, wherein the grille shutter device includes: a grille shutter provided in the grille opening and configured to change an opening degree of the grill shutter; a drive unit configured to drive the grille shutter; and a control unit configured to control the drive unit, the control unit being configured to control the drive unit to control the opening degree of the grille shutter to control the running air flowing to the engine through the grille opening, wherein the grille shutter device further includes a block lower-part temperature detecting unit configured to detect a temperature of a lower part of the cylinder block, and the control unit is configured to control the drive unit to control the opening degree of the grille shutter according to a detected temperature of the lower part of the cylinder block.

Effects of the Invention

According to the present invention, it is possible to control a cylinder block, especially, a lower part of the cylinder block to an appropriate temperature during operation of an engine.

DESCRIPTION OF EMBODIMENTS

First Embodiment

A first embodiment embodying a grille shutter device of the present invention will be described in detail below, referring to accompanying drawings.

Figure 1:
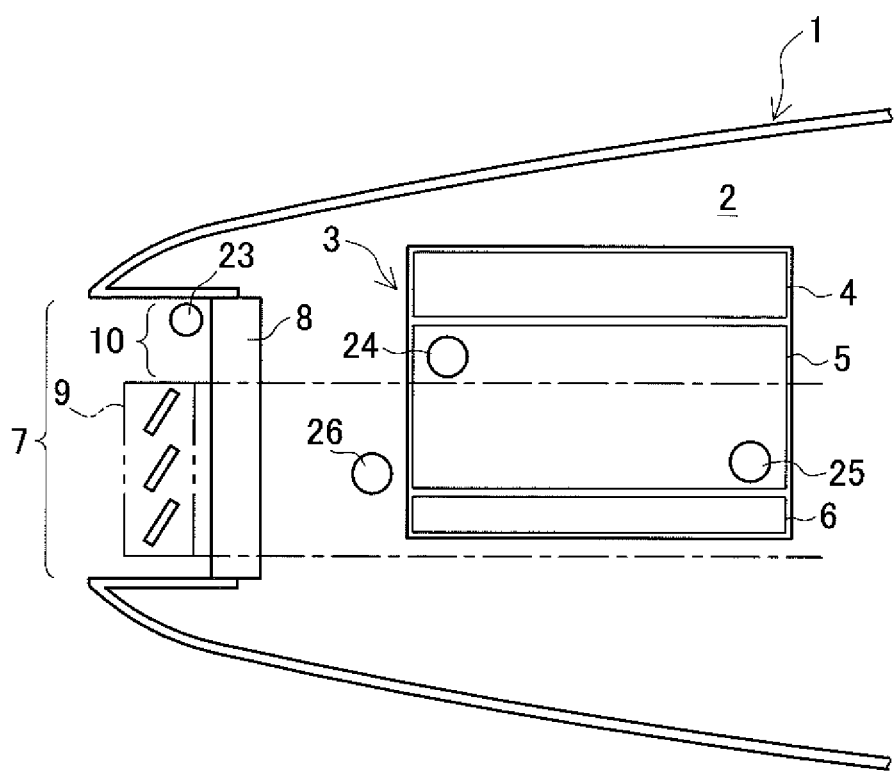
FIG. 1 is a schematic view of a front part of a vehicle in a first embodiment.

FIG. 1 is a schematic view of a front part of a vehicle 1. In an engine room 2 provided in the front part of the vehicle 1, an engine 3 is placed. This engine 3 includes, from above, a cylinder head 4, a cylinder block 5, and an oil pan 6. At the front side of the vehicle 1, a grille opening 7 communicating with the engine room 2 is provided. In the grille opening 7, a radiator 8 constituting a cooling device of the engine 3 is placed. In the radiator 8, coolant circulating through the engine 3 is flowed to exchange heat between the coolant and outside air. When the vehicle 1 runs, the running air flows into the grille opening 7, passes across the radiator 8, and then flows into the engine room 2. In the grille opening 7 and in front of the radiator 8, there is provided a grille shutter 9 configured to change an opening degree or angle thereof. This grille shutter 9 is placed in correspondence with a central part and a lower part of the grille opening 7 in its height direction. Accordingly, the position of the grille shutter 9 in the grille opening 7 corresponds to the position of a lower part of the cylinder block 5 and the oil pan 6. That is, the grille shutter 9 is placed in a position to control the running air flowing to the lower part of the cylinder block 5 and the oil pan 6. Further, in the upper part of the grille opening 7, the grille shutter 9 is not placed and a normally open part 10 that is normally open is provided. Through this normally open part 10, the running air always flows into the engine room 2 in association with running of the vehicle 1. Herein, the "lower part of the cylinder block 5" is assumed to be a vicinity of a lower side of a bottom dead center of a piston in a range of a cylinder bore in the cylinder block 5 and a vicinity of a bottom end of a coolant jacket.

Figure 2:
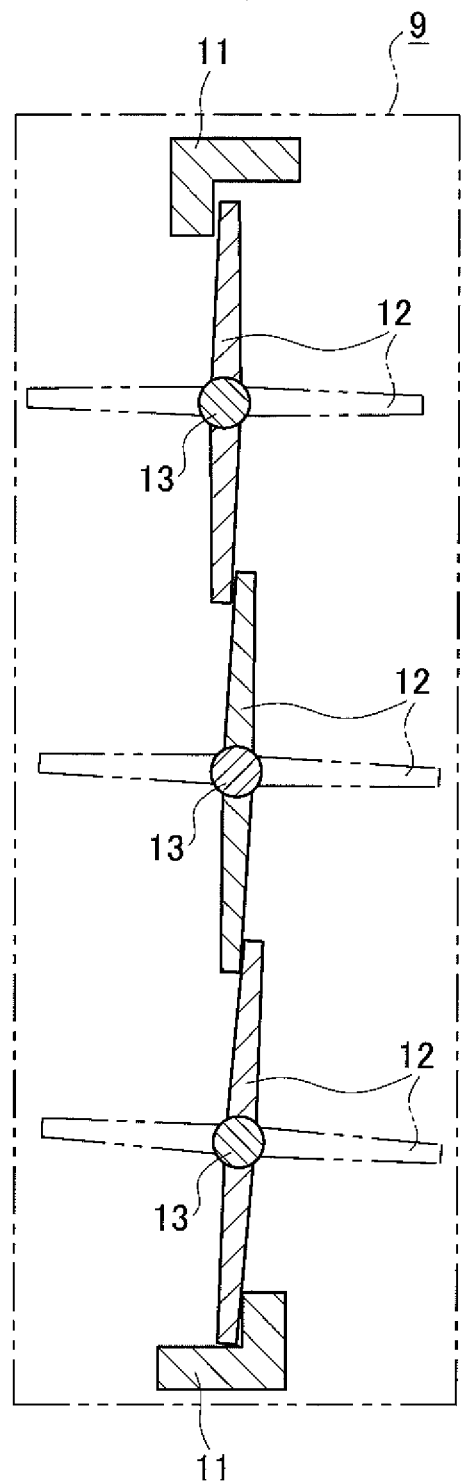
FIG. 2 is a longitudinal sectional view showing a schematic configuration of a grille shutter in the first embodiment.

FIG. 2 is a longitudinal sectional view showing a schematic configuration of the grille shutter 9. This grille shutter 9 includes a frame 11 formed in a horizontally-elongated nearly rectangular frame shape, in which a plurality of horizontally-elongated movable fins 12 are arranged in parallel one above another in a vertical direction. Each of the movable fins 12 is supported to be rotatable about a rotary shaft 13 placed extending over in a width direction of the frame 11 (in a direction perpendicular to the drawing sheet). The rotary shaft 13 of each movable fin 12 is arranged to rotate in sync with a link mechanism (see FIG. 3) 14. Accordingly, the grille shutter 9 is configured to change an opening degree or angle thereof by rotating each of the movable fins 12 between a fully open state where the fins 12 are disposed in a nearly horizontal state as indicated with chain double-dashed lines in FIG. 2 to allow the passage of running air to a maximum extent and a fully closed state where the fins 12 are disposed in a nearly vertical state as indicated with solid lines in FIG. 2 to block the passage of running air.

Specifically, in the fully open state of the grille shutter 9 indicated with the chain double-dashed lines in FIG. 2, each gap between the adjacent movable fins 12 is largest, allowing the passage of running air to a maximum extent. On the other hand, in the fully closed state of the grille shutter 9 indicated with the solid lines in FIG. 2, edge portions of the adjacent fins 12 overlap each other and the edge portions of the endmost fins 12 engage with the frame 11, so that the gaps between the adjacent fins 12 are eliminated, thus blocking the passage of running air. The grille shutter 9 can change the opening degree by changing the rotation angle of each fin 12 in a range between the fully closed state and the fully open state, thereby regulating a flow rate of the running air.

Figure 3:
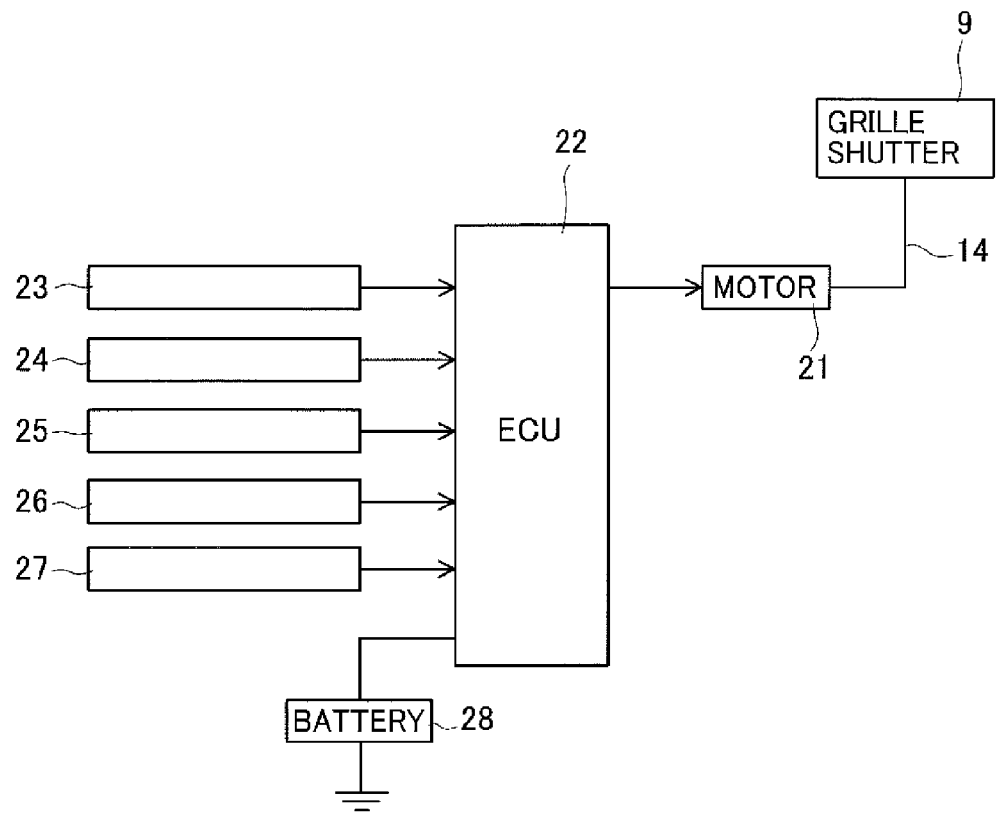
FIG. 3 is a block diagram showing an electric configuration and others of the grille shutter device in the first embodiment.

FIG. 3 is a block diagram showing an electric configuration and others of the grille shutter device. The grille shutter device is provided with a motor 21 configured to drive the grille shutter 9 via the link mechanism 14 (including a gear mechanism), an electronic control unit (ECU) 22 configured to control the motor 21, an ambient temperature sensor 23 for detecting the temperature THA of ambient air (ambient temperature), a coolant temperature sensor 24 for detecting the temperature THW of coolant (coolant temperature) of the engine 3, a block lower-part temperature sensor 25 for detecting the temperature THB of the lower part of the cylinder block 5 (block lower-part temperature), an engine compartment temperature sensor 26 for detecting the temperature THEC in the engine room 2 (engine compartment temperature), a vehicle speed sensor 27 for detecting the speed SPD of the vehicle 1 (vehicle speed), and a battery 28 for supplying electric power to the ECU 22. Each of the sensors 23 to 27 is connected to an input side of the ECU 22, and the motor 21 is connected to an output side of the ECU 22. The ambient temperature sensor 23 is placed as shown in FIG. 1 in the normally open part 10 of the grille opening 7. The coolant temperature sensor 24 is placed in an upper part of the cylinder block 5. The block lower-part temperature sensor 25 is placed in the lower part of the cylinder block 5. The engine compartment temperature sensor 26 is placed in the vicinity of the lower part of the cylinder block 5 in the engine room 2. The ambient temperature sensor 23 corresponds to one example of an ambient temperature detecting unit of the present invention. The block lower-part temperature sensor 25 and the engine compartment temperature sensor 26 correspond to one example of a block lower-part temperature detecting unit of the present invention. The vehicle speed sensor 27 corresponds to one example of a vehicle speed detecting unit of the present invention. The motor 21 corresponds to one example of a drive unit of the present invention. The ECU 22 corresponds to one example of a control unit of the present invention. The ECU 22 is configured to store an opening-closing control program to control the grille shutter 9 to open and close, and control the motor 21 based on a detection signal of each sensor 23 to 27 according to the program to control the opening degree of the grille shutter 9. This controls the running air flowing to the engine 3 through the grille opening 7.

Figure 4:
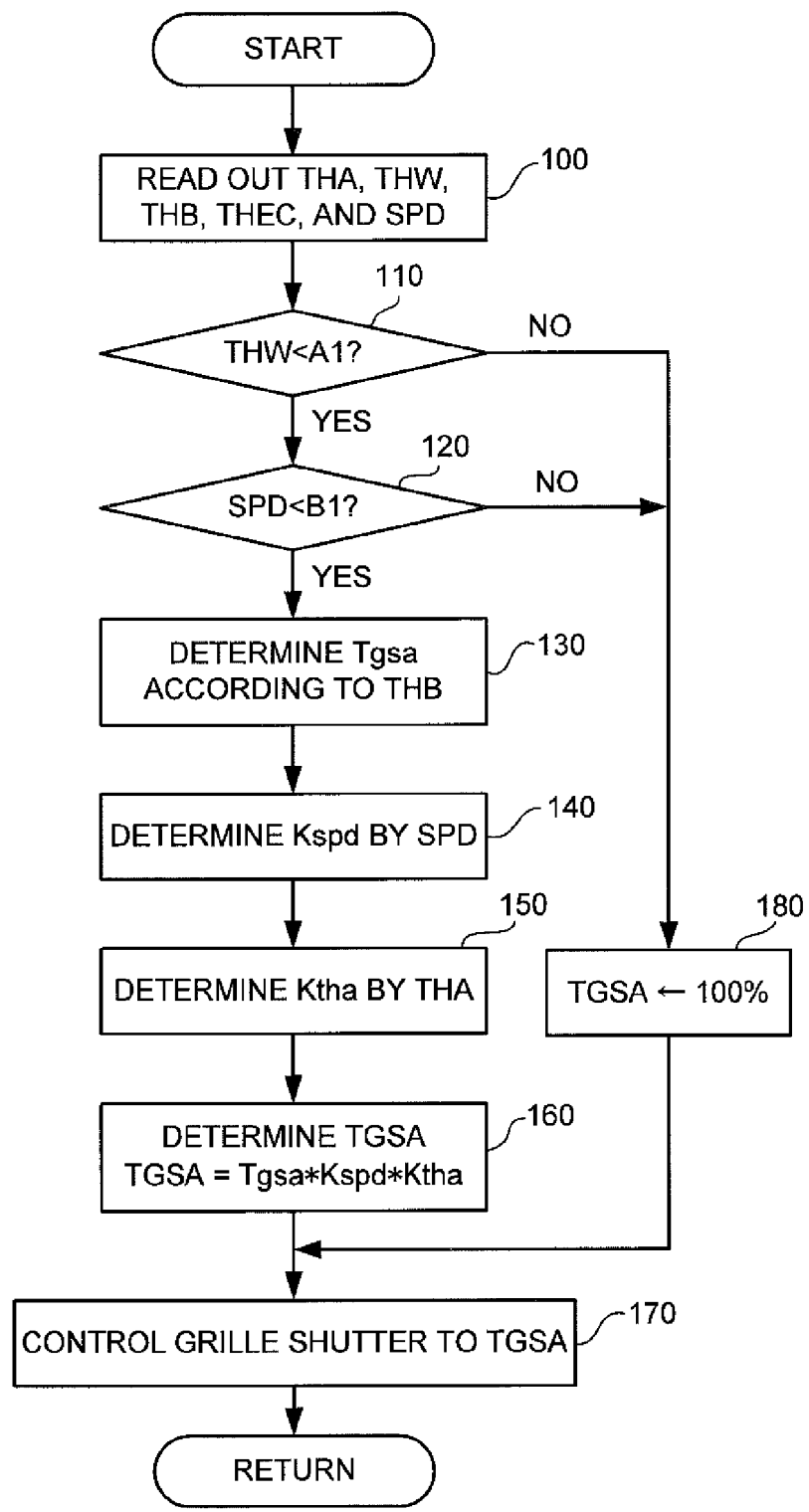
FIG. 4 is a flowchart showing an opening-closing control program in the first embodiment.

FIG. 4 is a flowchart showing the above-described opening-closing control program. The ECU 22 periodically executes the routine of this flowchart at predetermined time intervals.

When the processing proceeds to this routine, in step 100, the ECU 22 first reads out the ambient temperature THA, the coolant temperature THW, the block lower-part temperature THB, the engine compartment temperature THEC, and the vehicle speed SPD based on the detection values from the sensors 23 to 27, respectively.

In step 110, the ECU 22 judges whether the coolant temperature THW is lower than a predetermined value A1. Herein, the predetermined value A1 is a criterion or reference value for judging that warm-up of the engine 3 is completed. When this judgement result is affirmative, the ECU 22 advances the processing to step 120. When this judgement result is negative, the ECU 22 shifts the processing to step 180.

In step 120, the ECU 22 judges whether or not the vehicle speed SPD is lower than a predetermined value B1. Herein, the predetermined value B1 is a reference value for judging that the running air introduced into the grille opening 7 is equal to or more than a necessary flow rate. When this judgement result is affirmative, the ECU 22 advances the processing to step 130. When this judgement result is negative, the ECU 22 shifts the processing to step 180.

In step 180 subsequent to step 110 or 120, the ECU 22 sets the control opening degree TGSA of the grille shutter 9 to "100%", that is, full open, and shifts the processing to step 170.

Figure 5:
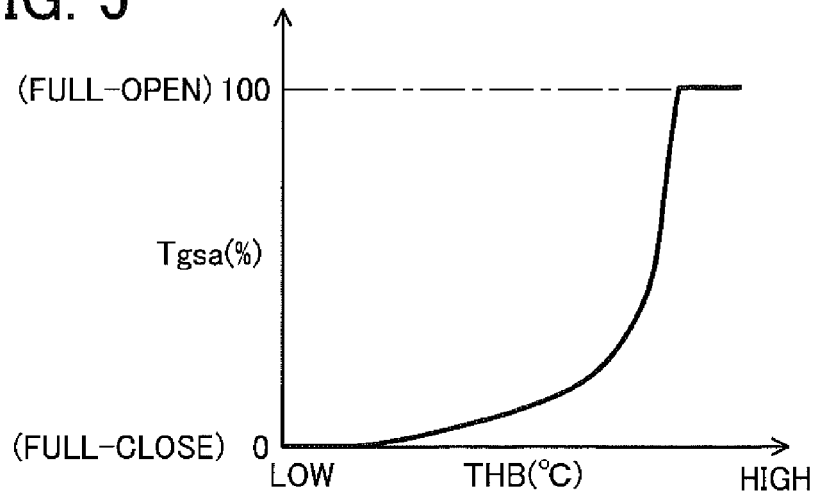
FIG. 5 is a map to be referred to when a basic opening degree is to be determined in the first embodiment.

On the other hand, in step 130 subsequent to step 120, the ECU 22 determines a basic opening degree Tgsa according to the block lower-part temperature THB. The ECU 22 can determine this basic opening degree Tgsa according to the block lower-part temperature THB by referring to a map shown in FIG. 5, for example. This map is set as below. When the block lower-part temperature THB becomes higher from a low temperature region to a middle temperature region, the basic opening degree Tgsa slowly increases from "0". When the block lower-part temperature THB becomes higher in a high temperature region, the basic opening degree Tgsa rapidly increases to "100%".

Figure 6:
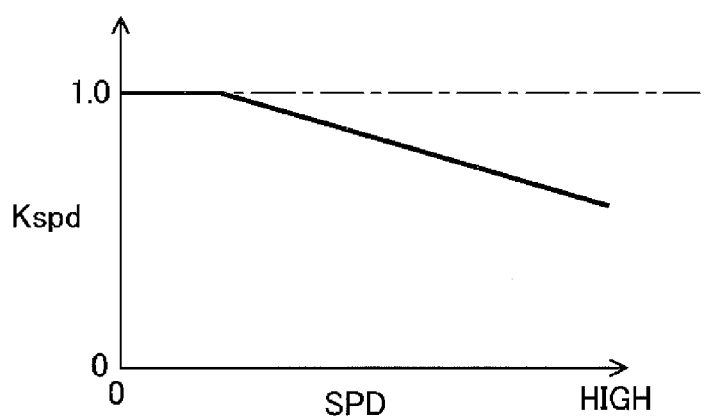
FIG. 6 is a map to be referred to when a vehicle speed correction coefficient is to be determined in the first embodiment.

In step 140, successively, the ECU 22 determines a vehicle speed correction coefficient Kspd based on the vehicle speed SPD. The ECU 22 can determine this vehicle speed correction coefficient Kspd according to the vehicle speed SPD by referring to a map shown in FIG. 6, for example. This map is set as below. In a range where the vehicle speed SPD is lower than the predetermined value B1, the vehicle speed correction coefficient Kspd is "1.0" in a low speed region of the vehicle speed SPD, and the vehicle speed correction coefficient Kspd is gradually lower as the vehicle speed SPD is higher than the low speed region. As the vehicle speed SPD is higher, a larger quantity of the running air flows into the engine room 2, causing an increase in the cooling effect of the cylinder block 5 by the running air. Therefore, the map property is set such that the opening degree of the grille shutter 9 is corrected toward a closed side as the vehicle speed SPD is higher.

Figure 7:
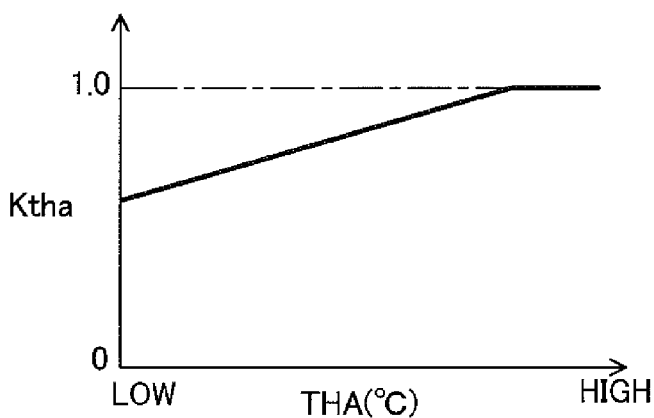
FIG. 7 is a map to be referred to when an ambient temperature correction coefficient is to be determined in the first embodiment.

In step 150, the ECU 22 determines the ambient temperature correction coefficient Ktha based on the ambient temperature THA. The ECU 22 can determine this ambient temperature correction coefficient Ktha according to the ambient temperature THA by referring to a map shown in FIG. 7, for example. This map is set as below. As the ambient temperature THA is higher, the ambient temperature correction coefficient Ktha gradually increases from "about 0.6" to "1.0". As the ambient temperature THA is lower immediately after the engine 3 starts, a larger quantity of the running air flows into the engine room 2, causing a decrease in the warm-up effect of the cylinder block 5. Therefore, the map property is set such that the opening degree of the grille shutter 9 is corrected toward a closed side as the ambient temperature THA is lower.

In step 160, the ECU 22 then determines a control opening degree TGSA according to the following formula (1). Specifically, the control opening degree TGSA can be obtained by multiplying the basic opening degree Tgsa by the vehicle speed correction coefficient Kspd and the ambient temperature correction coefficient Ktha.

$$TGSA = Tgsa * Kspd * Ktha \quad (1)$$

In step 170 subsequent to step 180 or 160, the ECU 22 controls the grille shutter 9 to the control opening degree TGSA. Thereafter, the ECU 22 returns the processing to step 100.

According to the above control, the ECU 22 is configured to control the motor 21 to control the opening degree of the grille shutter 9 according to the block lower-part temperature THB detected by the block lower-part temperature sensor 25. Further, the ECU 22 determines a basic opening degree Tgsa of the grille shutter 9 according to the block lower-part temperature THB, and further corrects the determined basic opening degree Tgsa with the vehicle speed correction coefficient Kspd according to the vehicle speed SPD detected by the vehicle speed sensor 27 and the ambient temperature correction coefficient Ktha according to the ambient temperature THA detected by the ambient temperature sensor 23, to determine the control opening degree TGSA. The ECU 22 thus controls the motor 21 to adjust the opening degree of the grille shutter 9 to the determined control opening degree TGSA.

According to the grille shutter device in the above-explained embodiment, the ECU 22 controls the motor 21 to control the opening degree of the grille shutter 9 according to the block lower-part temperature THB. Therefore, since the opening degree of the grille shutter 9 is controlled according to the block lower-part temperature THB, the running air flowing to the engine 3 through the grille opening 7 is controlled, thereby regulating a flow rate of the running air allowed to impinge on the lower part of the cylinder block 5 according to the block lower-part temperature THB so that the lower part of the cylinder block 5 is cooled as needed or is not cooled. During operation of the engine 3, therefore, the cylinder block 5, especially, the lower part of the cylinder block 5, can be controlled to an appropriate temperature.

In the present embodiment, particularly, the grille shutter 9 is placed in a position to control the running air flowing to the lower part of the cylinder block 5 and the oil pan 6. Therefore, the flow rate of the running air allowed to impinge on the lower part of the cylinder block 5 and the oil pan 6 is more directly regulated, and the lower part of the cylinder block 5 is efficiently cooled as needed or is not cooled. Consequently, during operation of the engine 3, the cylinder block 5, especially, the lower part of the cylinder block 5, can be controlled more effectively to an appropriate temperature.

In the present embodiment, the basic opening degree Tgsa of the grille shutter 9 according to the block lower-part temperature THB is determined and this basic opening degree Tgsa is corrected according to the vehicle speed SPD by the ECU 22 to determine the control opening degree TGSA. The motor 21 is controlled to adjust the opening degree of the grille shutter 9 to the determined control opening degree TGSA. Accordingly, a flow rate of the running air flowing to the lower part of the cylinder block 5 through the grille opening 7 is regulated in response to the block lower-part temperature THB and also is corrected in response to the vehicle speed SPD. Therefore, during operation of the engine 3, the lower part of the cylinder block 5 can be controlled to an appropriate temperature according to differences in vehicle speed SPD.

In the present embodiment, furthermore, the determined basic opening degree Tgsa is further corrected by the ECU 22 according to the ambient temperature THA to determine the control opening degree TGSA. Then, the motor 21 is controlled to adjust the opening degree of the grille shutter 9 to the determined control opening degree TGSA. Accordingly, a flow rate of the running air allowed to flow to the lower part of the cylinder block 5 through the grille opening 7 is further corrected according to the ambient temperature THA. Therefore, during operation of the engine 3, the lower part of the cylinder block 5 can further be controlled to an appropriate temperature according to differences in ambient temperature THA.

Herein, when the running air flows into the engine room 2 through the grille opening 7, the running air passes across the radiator 8. Accordingly, the coolant flowing through the radiator 8 is cooled by the running air, so that the coolant can prompt cooling of the cylinder block 5

Second Embodiment

A second embodiment embodying a grille shutter device of the present invention will be described in detail below, referring to accompanying drawings.

In the following explanation, similar or identical parts to those in the first embodiment are given the same reference signs and their explanations are omitted. The following explanation is given with a focus on differences from the first embodiment.

Figure 8:
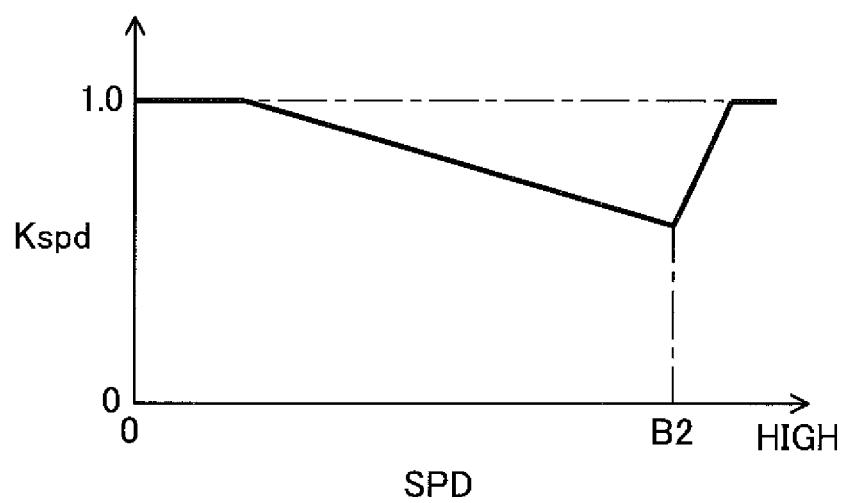
FIG. 8 is a map to be referred to when a vehicle speed correction coefficient is to be determined in a second embodiment.

The second embodiment differs from the first embodiment in the property of the map to be referred to in step 140 in the flowchart of FIG. 4. FIG. 8 shows a map to be referred to when the vehicle speed correction coefficient Kspd is to be determined in step 140 in the second embodiment. The map of FIG. 8 is set as below. In the lower range than the predetermined value B1, the vehicle speed correction coefficient Kspd is "1.0" in a low speed region of the vehicle speed SPD, and the vehicle speed correction coefficient Kspd is gradually lower as the vehicle speed SPD is higher than the low speed region. When the vehicle speed SPD becomes higher than a predetermined value B2, the vehicle speed correction coefficient Kspd rapidly increases to "1.0". Herein, when the vehicle speed SPD exceeds the predetermined value B2, the quantity of heat generated in the engine 3 increases, resulting in a sharp rise in the temperature of the engine 3. At that time, if the grille shutter 9 is delayed in opening, the engine 3 may overheat. In this map property, when the vehicle speed SPD rises to the predetermined value B2 or higher, the opening degree of the grille shutter 9 is preferentially and rapidly corrected to full open.

According to the present embodiment, consequently, in addition to the operation advantage of the first embodiment, the grille shutter 9 is preferentially and rapidly opened to a fully open position when the vehicle speed SPD rises to the predetermined value B2 or higher. This increases the flow rate of the running air allowed to flow to the engine 3, thereby enabling preventing overheating of the engine 3.

Third Embodiment

A third embodiment embodying a grille shutter device of the present invention will be described in detail below, referring to accompanying drawings.

Figure 9:
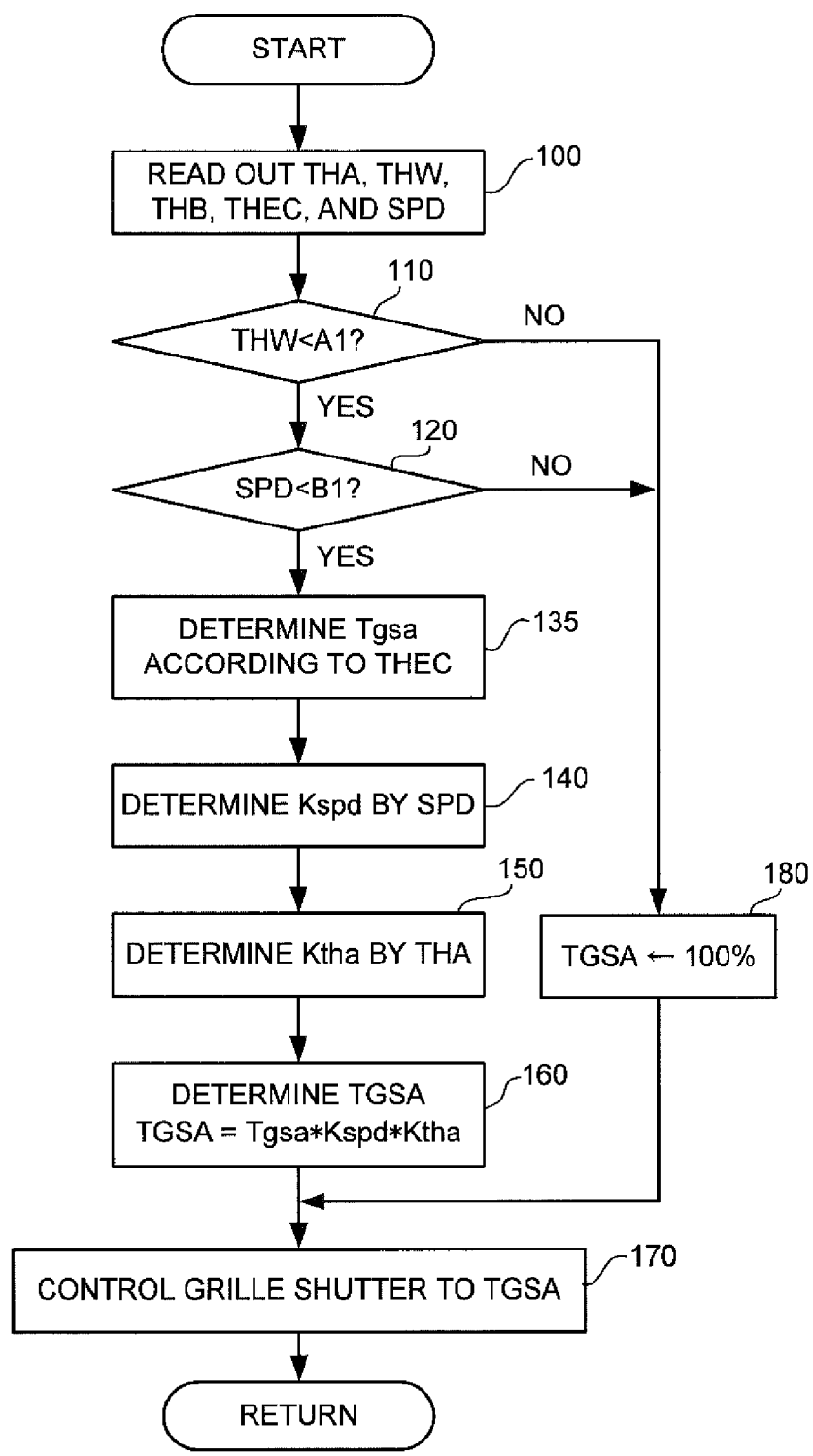
FIG. 9 is a flowchart showing an opening-closing control program in a third embodiment.

The third embodiment differs from each of the above-described embodiments in the details of the opening-closing control program. FIG. 9 is a flowchart showing the opening-closing control program in the present embodiment. In the flowchart of FIG. 9, the processing of step 135 is provided instead of the step 130 in the flowchart of FIG. 4.

Figure 10:
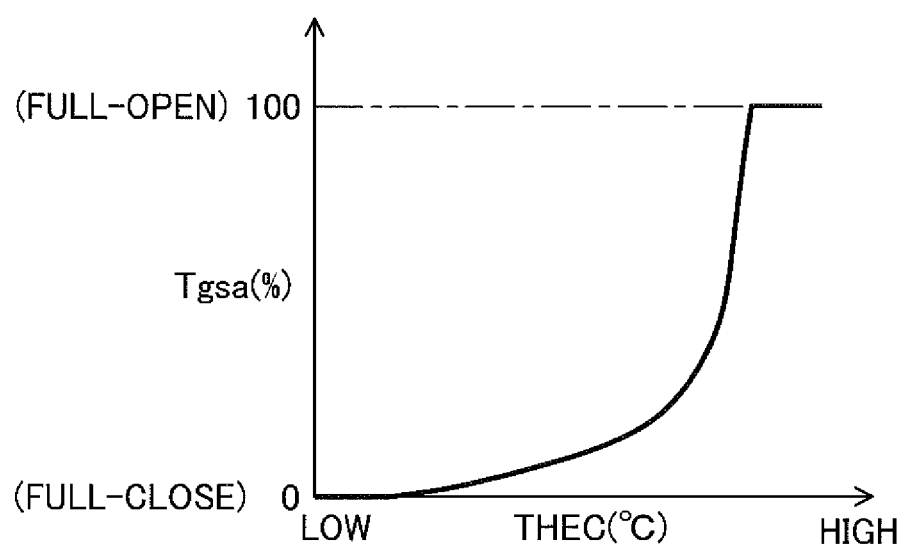
FIG. 10 is a map to be referred to when a basic opening degree is to be determined in the third embodiment.

In step 135, specifically, the ECU 22 determines a basic opening degree Tgsa according to the engine compartment temperature THEC. The ECU 22 can determine this basic opening degree Tgsa according to the engine compartment temperature THEC by referring to a map shown in FIG. 10, for example. This map is set as below. When the engine compartment temperature THEC becomes higher from the low temperature region to the middle temperature region, the basic opening degree Tgsa slowly increases from "0". When the engine compartment temperature THEC becomes higher in the high temperature region, the basic opening degree Tgsa rapidly increases to "100%" (full open).

According to the present embodiment, the basic opening degree Tgsa according to the engine compartment temperature THEC in the vicinity of the lower part of the cylinder block 5 can be determined. Herein, this engine compartment temperature THEC intercorrelates with changes in the block lower-part temperature THB. Thus, the present embodiment can also provide the operation advantage equivalent to that in the first embodiment.

Fourth Embodiment

A fourth embodiment embodying a grille shutter device of the present invention will be described in detail below, referring to accompanying drawings.

Figure 11:
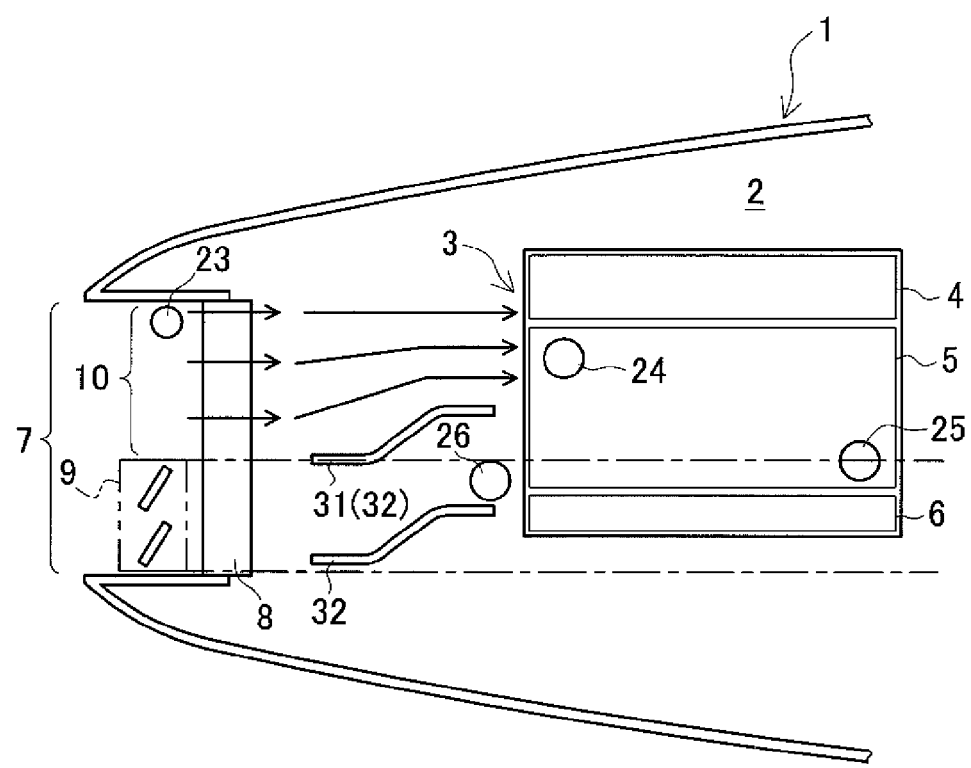
FIG. 11 is a schematic view of a front part of a vehicle in a fourth embodiment.

The fourth embodiment differs from each of the above-described embodiments in the position of the grille shutter 9 and the configuration associated therewith. FIG. 11 is a schematic view of a front part of a vehicle 1 in the present embodiment. In the present embodiment, as shown in FIG. 11, from the relationship with the front side design and others of the vehicle 1, the grille shutter 9 is reduced in size and is placed in a lower part of the grille opening 7. Accordingly, the grille shutter 9 is placed in a position corresponding to an area from the lower part of the cylinder block 5 to below the oil pan 6. The normally open part 10 of the grille opening 7 is placed in a position corresponding to an area from the lower part of the cylinder block 5 up to a middle part of the cylinder head 4. In the present embodiment, therefore, an air restriction plate 31 for restricting a flow of running air (running airflow) is provided in the engine room 2 to prevent the running air flowing into the engine room 2 through the normally open part 10 from impinging on the lower part of the cylinder block 5. In the present embodiment, an air guide plate 32 is provided to guide a running airflow to make the running air passing through the grille shutter 9 and flowing into the engine room 2 impinge mainly on the lower part of the cylinder block 5. In the present embodiment, the air restriction plate 31 also functions as the air guide plate 32. Those air restriction plate 31 and air guide plate 32 are each constituted of a bent plate and placed in front of the engine 3 in the engine room 2. Other parts or components in the present embodiment are similar or identical to those in the first embodiment.

According to the present embodiment, therefore, the running airflow through the normally open part 10 of the grille opening 7 into the engine room 2 is restricted or avoided from impinging on the lower part of the cylinder block 5 by the air restriction plate 31. Thus, the lower part of the cylinder block 5 is not cooled with the running air flowing through the normally open part 10. Accordingly, even when the running air flows in through the normally open part 10, the lower part of the cylinder block 5 can be controlled to an appropriate temperature and the effect by the grille shutter 9 related to temperature control of the lower part of the cylinder block 5 can be brought out to a maximum extent.

According to the present embodiment, further, the running airflow passing through the grille shutter 9 and traveling toward the engine room 2 is guided to impinge mainly on the lower part of the cylinder block 5. Thus, irrespective of the correlation between the attachment position of the grille shutter 9 in the grille opening 7 and the position of the cylinder block 5, the lower part of the cylinder block 5 is effectively cooled with the running air passing through the grille shutter 9. Therefore, irrespective of the position of the grille shutter 9 in the grille opening 7 and the position of the lower part of the cylinder block 5 in the engine room 2, the lower part of the cylinder block 5 can be controlled to an appropriate temperature, so that the effect by the grille shutter 9 related to temperature control of the lower part of the cylinder block 5 can be brought out to a maximum extent.

Fifth Embodiment

A fifth embodiment embodying a grille shutter device of the present invention will be described in detail below, referring to accompanying drawings.

Figure 12:
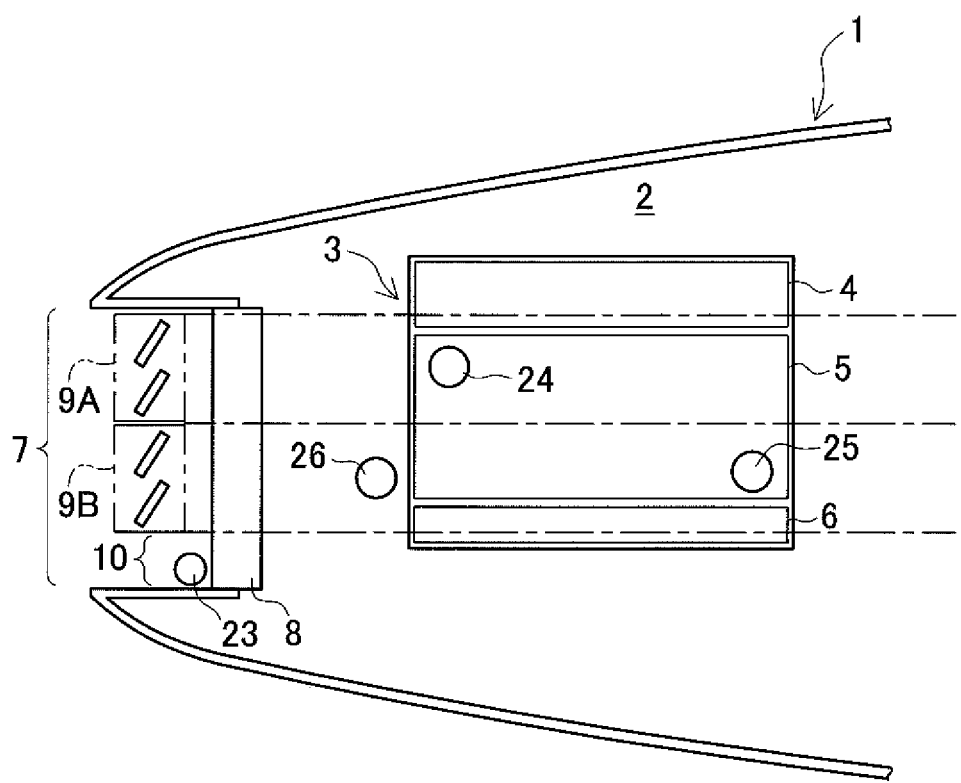
FIG. 12 is a schematic view of a front part of a vehicle in a fifth embodiment.

The fifth embodiment differs from each of the above-described embodiments in that two grille shutters 9A and 9B are provided and further a mechanism and an opening-closing control program associated therewith are provided. FIG. 12 is a schematic view of a front part of a vehicle 1 in the present embodiment. In the present embodiment, as shown in FIG. 12, there are provided a first grille shutter 9A placed in an upper part of the grille opening 7 and configured to control running air allowed to flow to an upper part of the cylinder block 5 and a lower part of the cylinder head 4, and a second grille shutter 9B placed under the first grille shutter 9A and configured to control running air allowed to flow to a lower part of the cylinder block 5 and the oil pan 6. Under the second grille shutter 9B, the normally open part 10 is provided. The first grille shutter 9A is placed in correspondence with the upper part of the cylinder block 5 and the lower part of the cylinder head 4. The second grille shutter 9B is placed in correspondence with the lower part of the cylinder block 5 and a part of the oil pan 6.

Figure 13:
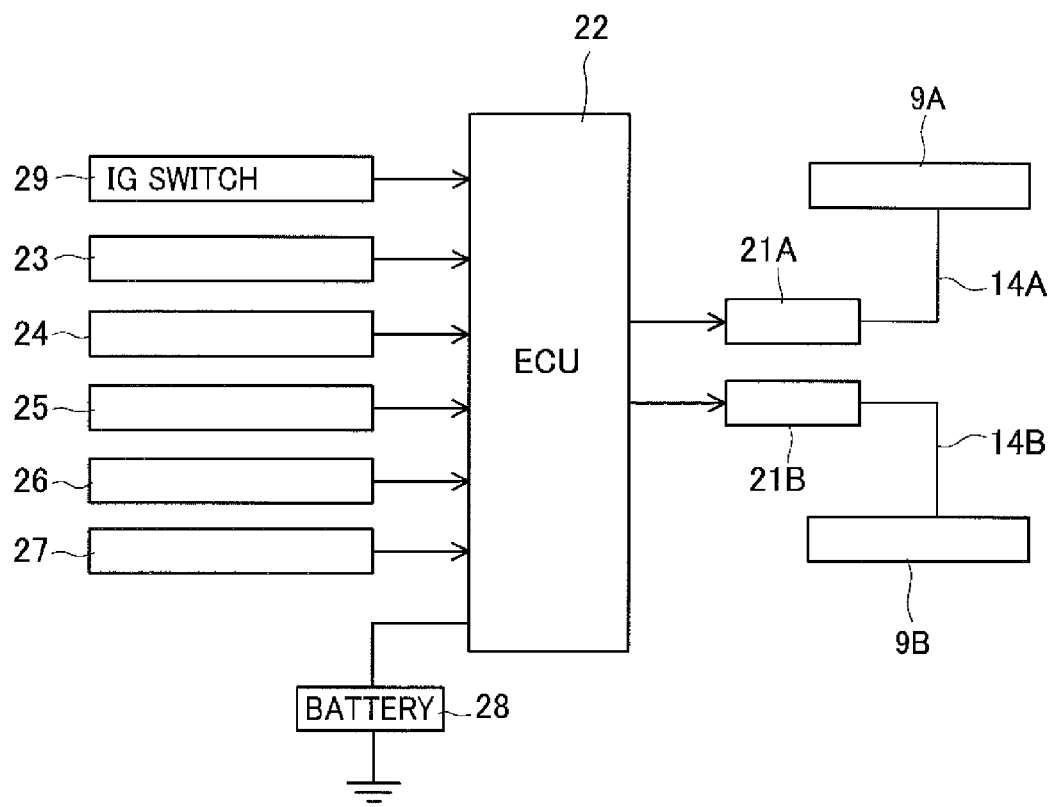
FIG. 13 is a block diagram showing an electric configuration and others of a grille shutter device in the fifth embodiment.

FIG. 13 is a block diagram showing an electric configuration and others of the grille shutter device in the fifth embodiment. This embodiment differs from the block diagram of FIG. 3 in that a first link mechanism 14A and a first motor 21A to drive the first grille shutter 9A, a second link mechanism 14B and a second motor 21B to drive the second grille shutter 9B, and an ignition switch (IG switch) 29 are provided. The IG switch 29 is configured to be operated by a driver to start or stop the engine 3. The IG switch 29 is connected to an input side of the ECU 22. The first and second motors 21A and 21B are connected to an output side of the ECU 22. The ECU 22 is configured to control the first and second motors 21A and 21B based on detection signals of each sensor 23-27 and the IG switch 29, thereby controlling the opening degrees of the first and second grille shutters 9A and 9B.

Figure 14:
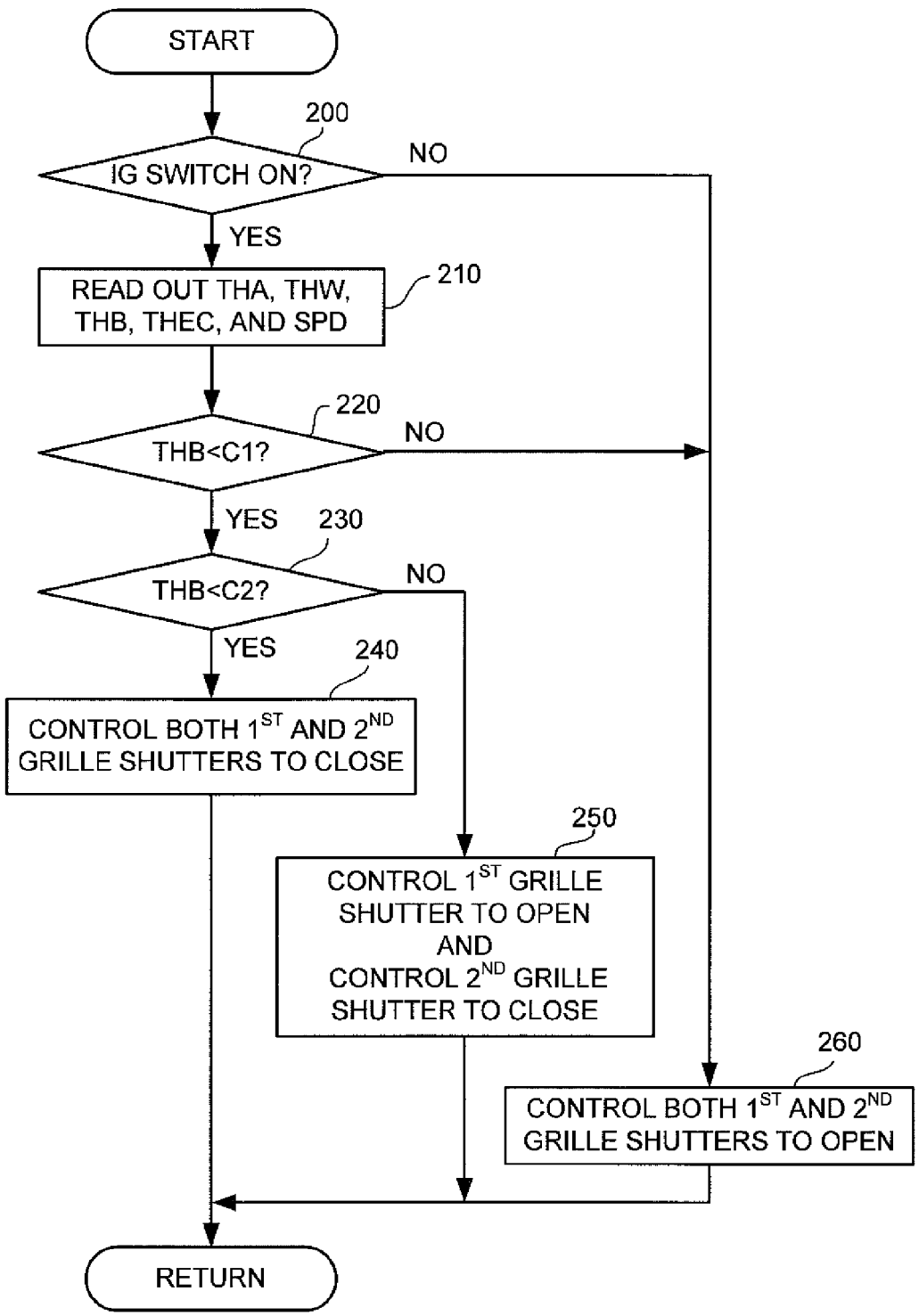
FIG. 14 is a flowchart showing an opening-closing control program in the fifth embodiment.

FIG. 14 is a flowchart showing an opening-closing control program in the present embodiment. The ECU 22 periodically executes the routine of this flowchart at predetermined time intervals.

When the processing proceeds to this routine, in step 200, the ECU 22 first judges whether or not the IG switch 29 is ON. If this judgement result is affirmative, the ECU 22 advances the processing to step 210. If this judgement result is negative, the ECU 22 shifts the processing to step 260.

In step 260, the ECU 22 controls both the first grille shutter 9A and the second grille shutter 9B to open. For this purpose, the ECU 22 controls the first and second motors 21A and 21B. Accordingly, when the engine 3 is stopped, the grille opening 7 including the normally open part 10 is fully opened to allow communication between the engine room 2 and outside. Then, the ECU 22 returns the processing to step 200.

In step 210, on the other hand, the ECU 22 reads out the ambient temperature THA, the coolant temperature THW, the block lower-part temperature THB, the engine compartment temperature THEC, and the vehicle speed SPD based on detection values of the sensors 23-27, respectively.

In step 220, successively, the ECU 22 judges whether or not the block lower-part temperature THB is lower than a predetermined value C1. Herein, the predetermined value C1 is a reference value to judge that warm-up of the lower part of the cylinder block 5 is completed. For example, "90° C." can be applied to this value C1. If this judgement result is affirmative, the ECU 22 advances the processing to step 230. If this judgment result is negative, the ECU 22 shifts the processing to step 260.

In step 230, the ECU 22 judges whether or not the block lower-part temperature THB is lower than a predetermined value C2. Herein, the predetermined value C2 is a lower value than the predetermined value C1. For example, "80° C." can be applied to this value C2. If this judgement result is affirmative, the ECU 22 advances the processing to step 240. If this judgment result is negative, the ECU 22 shifts the processing to step 250.

In step 240, the ECU 22 controls both the first and second grille shutters 9A and 9B to close. For this purpose, the ECU 22 controls the first and second motors 21A and 21B. Accordingly, when warm-up of the lower part of the cylinder block 5 is not yet completed after the start of the engine 3, both the first and second grille shutters 9A and 9B are closed, blocking the running airflow to the engine 3. Thus, cooling of the engine 3 with the running air is stopped. Thereafter, the ECU 22 returns the processing to step 200.

In step 250 subsequent to step 230, the ECU 22 controls the first grille shutter 9A to open and the second grille shutter 9B to close. For this purpose, the ECU 22 controls the first and second motors 21A and 21B. Accordingly, if the lower part of the cylinder block 5 has a slightly lower temperature than in a warm-up completed state after start of the engine 3, only the second grille shutter 9B corresponding to the lower part of the cylinder block 5 is closed, blocking the running airflow to the lower part of the cylinder block 5. Thus, the upper part of the cylinder block 5 and the lower part of the cylinder head 4 are cooled with the running air, while the lower part of the cylinder block 5 is stopped from being cooled with the running air. Then, the ECU 22 returns the processing to step 200.

In step 260 subsequent to step 220, on the other hand, the ECU 22 controls both the first and second grille shutters 9A and 9B to open in a similar manner to the above. Accordingly, when warm-up of the lower part of the cylinder block 5 is completed after the start of the engine 3, the grille opening 7 is fully opened. As a result, almost the whole engine 3 is exposed to the running air and thus the engine 3 is cooled with the running air. Thereafter, the ECU 22 returns the processing to step 200.

According to the above control, when the ECU 22 judges that the warm-up of the lower part of the cylinder block 5 is not yet completed based on the detected block lower-part temperature THB, the ECU 22 controls the first and second motors 21A and 21B to control both the first and second grille shutters 9A and 9B to close in order to block the running air from flowing from the grille opening 7 to the engine room 2 (the lower part of the cylinder block 5). Thereafter, while warm-up of the lower part of the cylinder block 5 is proceeding toward completion, the ECU 22 also controls the first and second motors 21A and 21B to cause the first grille shutter 9A to open first and the second grille shutter 9B to open at a later timing than the first grille shutter 9A.

According to the grille shutter device in the present embodiment explained above, when it is determined that the warm-up of the lower part of the cylinder block 5 is not yet completed based on the block lower-part temperature THB, the first and second motors 21A and 21B are controlled to control the first and second grille shutters 9A an 9B respectively to close in order to block the running air from flowing from the grille opening 7 to the lower part of the cylinder block 5. Accordingly, the running air will not impinge on the lower part of the cylinder block 5. This can prompt warm-up of the lower part of the cylinder block 5.

In the present embodiment, when it is determined that warm-up of the lower part of the cylinder block 5 is not yet completed based on the block lower-part temperature THB, the first motor 21A and the second motor 21B are controlled to close both the first grille shutter 9A and the second grille shutter 9B, respectively. Thereafter, while warm-up of the lower part of the cylinder block 5 is proceeding toward completion, the first and second motors 21A and 21B are controlled to open the first grille shutter 9A first and then open the second grille shutter 9B at a later timing than the first grille shutter 9A. According to a difference between the warm-up state of the upper part of the cylinder block 5 and the cylinder head 4 and the warm-up state of the lower part of the cylinder block 5, blocking and supplying of running air to each of them are controlled separately. Therefore, warm-up of the upper part of the cylinder block 5 and the cylinder head 4 and warm-up of the lower part of the cylinder block 5 can be separately appropriately controlled. This can bring out the effect of the grille shutters 9A and 9B related to warm-up control of the engine 3 to a maximum extent.

Sixth Embodiment

A sixth embodiment embodying a grille shutter device of the present invention will be described in detail below, referring to accompanying drawings.

Figure 15:
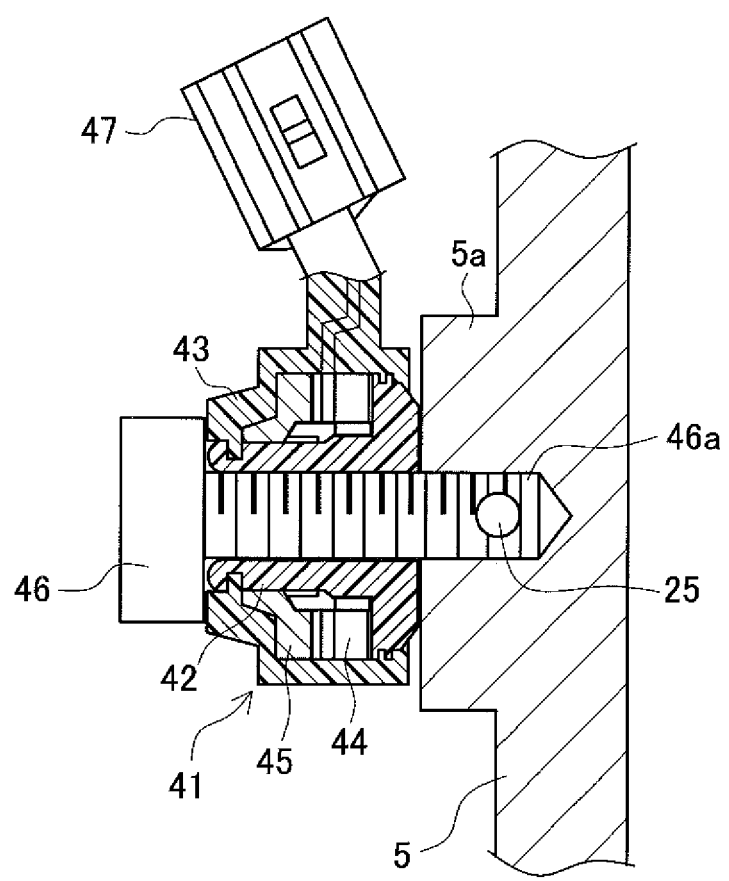
FIG. 15 is a sectional view showing a knock sensor including a block lower-part temperature sensor built therein in a sixth embodiment.

The sixth embodiment differs from each of the above-described embodiments in the configuration of the block lower-part temperature sensor 25. FIG. 15 is a sectional view of a knock sensor 41 having the block lower-part temperature sensor 25 built therein. As shown in FIG. 15, an attaching part 5a provided to protrude from the lower part of the cylinder block 5 is attached with the knock sensor 41 for detecting knocking of the engine 3. This knock sensor 41 corresponds to one example of a knocking detection unit of the present invention and is connected to an ECU (not shown). The knock sensor 41 includes a base 42 and a cover 43, each of which has a nearly cylindrical shape, a piezo-electric ceramic 44 and a weight 45 which are held and accommodated between the base 42 and the cover 43, a metal bolt 46 extending through the base 42, and a connector 47 formed integrally with the cover 43. The bolt 46 is treaded into the attaching part 5a to secure the knock sensor 41 to the cylinder block 5. In the present embodiment, a shaft part 46a of the bolt 46 is formed with a hole in which the block lower-part temperature sensor 25 is mounted. Specifically, the block lower-part temperature sensor 25 is built in the knock sensor 41. The block lower-part temperature sensor 25 can be constituted of for example a thermistor. A wire of the block lower-part temperature sensor 25 is connected to the connector 47 of the knock sensor 41. In this manner, the block lower-part temperature sensor 25 is attached integrally with the knock sensor 41 to the lower part of the cylinder block 5.

According to the grille shutter device in the present embodiment explained above, the following operation advantage can be achieved in addition to the operation advantage in each of the above-described embodiments. Specifically, since the block lower-part temperature sensor 25 is attached integrally with the knock sensor 41 to the attaching part 5a of the cylinder block 5, the cylinder block 5 does not need to have a special attaching part for the block lower-part temperature sensor 25. This can omit additional machining or processing of the cylinder block 5. Thus, a conventional cylinder block can be used.

In the present embodiment, since the block lower-part temperature sensor 25 is built in the knock sensor 41, as long as the knock sensor 41 is attached to the lower part of the cylinder block 5, the block lower-part temperature sensor 25 is also simply attached to the same. Accordingly, a work of attaching this sensor 25 to the cylinder block 5 can be omitted.

In the present embodiment, a wire of the block lower-part temperature sensor 25 is connected to the connector 47 of the knock sensor 41. Thus, the connector 47 of the knock sensor 41 can also be used as a connector of the block lower-part temperature sensor 25. A wire harness for the knock sensor 41 connected to the connector 47 can be utilized as a wire harness for the block lower-part temperature sensor 25.

In the present embodiment, since the block lower-part temperature sensor 25 is built in the bolt 46 of the knock sensor 41, a conventional component can be used as the knock sensor 41. In this case, the bolt 46 is required only to be machined or processed. Furthermore, since the bolt 46 is made of metal, the heat of the cylinder block 5 is easy to transfer to the block lower-part temperature sensor 25 through the bolt 46. Thus, the block lower-part temperature sensor 25 can provide an improved accuracy of detecting the block lower-part temperature THB.

Seventh Embodiment

A seventh embodiment embodying a grille shutter device of the present invention will be described in detail below, referring to accompanying drawings.

Figure 16:
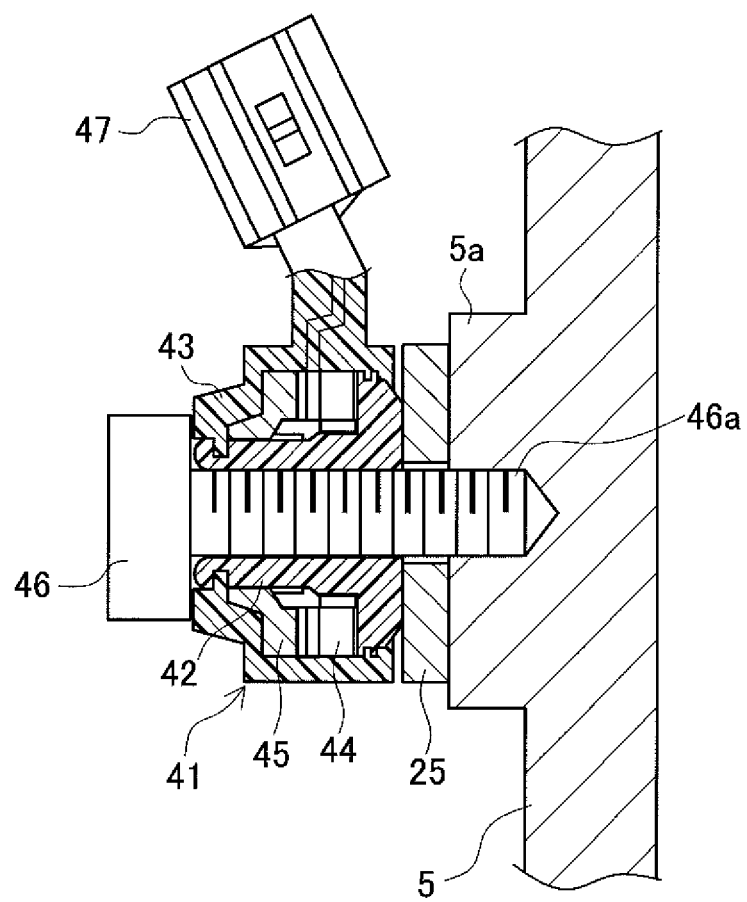
FIG. 16 is a sectional view showing a knock sensor integrally attached with a block lower-part temperature sensor in a seventh embodiment.

The seventh embodiment differs from the sixth embodiment in the position of the block lower-part temperature sensor 25 with respect to the knock sensor 41. FIG. 16 is a sectional view of the knock sensor 41 attached integrally with the block lower-part temperature sensor 25. In the present embodiment, as shown in FIG. 16, the block lower-part temperature sensor 25 has a flat disc-like shape and is fastened between and together with the knock sensor 41 and the attaching part 5a with the bolt 46. The block lower-part temperature sensor 25 is thus attached integrally with the knock sensor 41 to the lower part of the cylinder block 5.

Other parts or components in the present embodiment are similar or identical to those in each of the above-described embodiments.

The present embodiment similarly can provide an operation advantage that the cylinder block 5 does not need to have any special attaching part for the block lower-part temperature sensor 25, in addition to the operation advantage in each of the above-described embodiments. This can omit additional machining or processing of the cylinder block 5. Thus, a conventional cylinder block can be used.

The present invention is not limited to each of the above-described embodiments and may be embodied in other specific forms without departing from the essential characteristics thereof.

For instance, the grille shutter 9 shown in FIG. 2 in each of the above-described embodiments is one example and is not limited in structure thereto.

INDUSTRIAL APPLICABILITY

The present invention is applicable to a vehicle that mounts an engine in an engine room and is designed to flow running air into the engine room.

REFERENCE SIGNS LIST

1 Vehicle
2 Engine room
3 Engine
4 Cylinder head
5 Cylinder block
5a Attaching part
7 Grille opening
9 Grille shutter
9A First grille shutter
9B Second grille shutter
10 Normally open part
21 Motor (Drive unit)
21A First motor (Drive unit)
21B Second motor (Drive unit)
22 ECU (Control unit)
23 Ambient temperature sensor (Ambient temperature detecting unit)
25 Block lower-part temperature sensor (Block lower-part temperature detecting unit)
26 Engine compartment temperature sensor (Block lower-part temperature detecting unit)
27 Vehicle speed sensor (Vehicle speed detecting unit)
31 Air restriction plate
32 Air guide plate
41 Knock sensor (Knocking detecting unit)

The invention claimed is:

1. A grille shutter device for a vehicle,
the vehicle having an engine placed in an engine room provided in a front part of the vehicle,
the engine including a cylinder head and a cylinder block,
a grille opening being provided at a front side of the vehicle and communicating with the engine room, and
a radiator constituting a cooling device of the engine being provided in correspondence with an entire region in an upper and lower direction of the grille opening, wherein
the grille shutter device includes:
a grille shutter provided at a front side of the radiator in the grille opening and having an opening degree, the grille shutter being configured to change the opening degree;
a normally open part, in which the grille shutter is not provided, being provided on any one of an upper side and a lower side of the grille shutter in the grille opening;
a drive unit configured to drive the grille shutter; and
a control unit configured to control the drive unit,
the control unit being configured to control the drive unit to control the opening degree of the grille shutter to control running air flowing to the engine through the grille opening and the radiator,
the grille shutter device further includes a block lower-part temperature detecting unit configured to detect a temperature of a lower part of the cylinder block,
the grille shutter is positioned to control the running air flowing to the lower part of the cylinder block of the engine, and
the control unit is configured to control the drive unit to control the opening degree of the grille shutter according to a detected temperature of the lower part of the cylinder block.

2. The grille shutter device according to claim 1, wherein when the control unit judges that warm-up of the lower part of the cylinder block is not yet completed based on the detected temperature of the lower part of the cylinder block, the control unit controls the drive unit to control the grille shutter in order to block the running air flowing to the lower part of the cylinder block through the grille opening.

3. The grille shutter device according to claim 2, further including a vehicle speed detecting unit configured to detect a speed of the vehicle,
wherein the control unit is configured to determine a basic opening degree of the grille shutter according to the detected temperature of the lower part of the cylinder block, correct the determined basic opening degree according to the detected speed of the vehicle to determine a control opening degree, and control the drive unit to adjust the opening degree of the grille shutter to the determined control opening degree.

4. The grille shutter device according to claim 2, further including an ambient temperature detecting unit configured to detect an ambient temperature, and
wherein the control unit is configured to determine a basic opening degree of the grille shutter according to the detected temperature of the lower part of the cylinder block, correct the determined basic opening degree according to the detected ambient temperature to determine a control opening degree, and control the drive unit to adjust the opening degree of the grille shutter to the determined control opening degree.

5. The grille shutter device according to claim 1, further including a vehicle speed detecting unit configured to detect a speed of the vehicle,
wherein the control unit is configured to determine a basic opening degree of the grille shutter according to the detected temperature of the lower part of the cylinder block, correct the determined basic opening degree according to the detected speed of the vehicle to determine a control opening degree, and control the drive unit to adjust the opening degree of the grille shutter to the determined control opening degree.

6. The grille shutter device according to claim 5, further including an ambient temperature detecting unit configured to detect an ambient temperature, and
wherein the control unit is configured to determine a basic opening degree of the grille shutter according to the detected temperature of the lower part of the cylinder block, correct the determined basic opening degree according to the detected ambient temperature to determine a control opening degree, and control the drive unit to adjust the opening degree of the grille shutter to the determined control opening degree.

7. The grille shutter device according to claim 1, further including an ambient temperature detecting unit configured to detect an ambient temperature, and
wherein the control unit is configured to determine a basic opening degree of the grille shutter according to the detected temperature of the lower part of the cylinder block, correct the determined basic opening degree according to the detected ambient temperature to determine a control opening degree, and control the drive unit to adjust the opening degree of the grille shutter to the determined control opening degree.

8. The grille shutter device according to claim 1, wherein an air guide plate is provided in the engine room to guide a flow of the running air so that the running air passing through the grille shutter and flowing into the engine room impinges on the lower part of the cylinder block.

9. The grille shutter device according to claim 1, wherein
the grille shutter includes a first grille shutter on an upper side and a second grille shutter on a lower side, which are arranged one above the other in the grille opening part, the first grill shutter being configured to control the running air flowing to the upper part of the cylinder block and the cylinder head, and the second grille shutter being configured to control the running air flowing to the lower part of the cylinder block,
the drive unit includes a first drive unit configured to drive the first grille shutter and a second drive unit configured to drive the second grille shutter, and
the control unit is configured such that, when the control unit judges that warm-up of the lower part of the cylinder block is not yet completed based on the detected temperature of the lower part of the cylinder block, the control unit controls the first drive unit and the second drive unit to close both the first grille shutter and the second grille shutter, and then controls the first drive unit and the second drive unit to open the first grille shutter and then the second grille shutter at a later timing than the first grille shutter while warm-up of the lower part of the cylinder block is proceeding toward completion.

10. The grille shutter device according to claim 1, wherein
a knocking detecting unit configured to detect knocking of the engine is attached to the lower part of the cylinder block, and
the block lower-part temperature detecting unit is attached integrally with the knocking detecting unit to the lower part of the cylinder block.

11. The grille shutter device according to claim 10, wherein the block lower-part temperature detecting unit is built in the knocking detecting unit.

12. A grille shutter device for a vehicle,
the vehicle having an engine placed in an engine room provided in a front part of the vehicle,
the engine including a cylinder head and a cylinder block,
a grille opening being provided at a front side of the vehicle and communicating with the engine room, and
a radiator constituting a cooling device of the engine being provided in the grille opening, wherein
the grille shutter device includes:
a grille shutter provided at a front side of the radiator in the grille opening and having an opening degree, the grille shutter being configured to change the opening degree;
a drive unit configured to drive the grille shutter; and
a control unit configured to control the drive unit,
the control unit being configured to control the drive unit to control the opening degree of the grille shutter to control running air flowing to the engine through the grille opening and the radiator,
the grille shutter device further includes a block lower-part temperature detecting unit configured to detect a temperature of a lower part of the cylinder block,
the grille shutter is positioned to control the running air flowing to the lower part of the cylinder block of the engine,
the control unit is configured to control the drive unit to control the opening degree of the grille shutter according to a detected temperature of the lower part of the cylinder block, and
the grille opening is provided with a normally open part in which the grille shutter is not provided, and an air restriction plate is provided in the engine room to restrict a flow of the running air to prevent the running air flowing into the engine room through the normally open part from impinging on the lower part of the cylinder block.

13. A grille shutter device for a vehicle,
the vehicle having an engine placed in an engine room provided in a front part of the vehicle,
the engine including a cylinder head and a cylinder block,
a grille opening being provided at a front side of the vehicle and communicating with the engine room, and
a radiator constituting a cooling device of the engine being provided in the grille opening, wherein
the grille shutter device includes:
a grille shutter provided at a front side of the radiator in the grille opening and having an opening degree, the grille shutter being configured to change the opening degree;
a drive unit configured to drive the grille shutter; and
a control unit configured to control the drive unit,
the control unit being configured to control the drive unit to control the opening degree of the grille shutter to control running air flowing to the engine through the grille opening and the radiator,
the grille shutter device further includes a block lower-part temperature detecting unit configured to detect a temperature of a lower part of the cylinder block,
the grille shutter is positioned to control the running air flowing to the lower part of the cylinder block of the engine,
the control unit is configured to control the drive unit to control the opening degree of the grille shutter according to a detected temperature of the lower part of the cylinder block,
the grille opening is provided with a normally open part in which the grille shutter is not provided, and an air restriction plate is provided in the engine room to restrict a flow of the running air to prevent the running air flowing into the engine room through the normally open part from impinging on the lower part of the cylinder block, and
an air guide plate is provided in the engine room to guide a flow of the running air so that the running air passing through the grille shutter and flowing into the engine room impinges on the lower part of the cylinder block.

* * * * *